April 17, 1962 O. D. JACOBSON 3,030,451

SWITCHING DEVICE

Filed Nov. 4, 1958 3 Sheets-Sheet 1

INVENTOR
O. D. JACOBSON
BY John C. Morris
ATTORNEY

SWITCHING DEVICE

Filed Nov. 4, 1958

3 Sheets-Sheet 2

INVENTOR
O. D. JACOBSON
BY John C. Morris
ATTORNEY

April 17, 1962 O. D. JACOBSON 3,030,451

SWITCHING DEVICE

Filed Nov. 4, 1958 3 Sheets-Sheet 3

INVENTOR
O. D. JACOBSON
BY John C. Morris
ATTORNEY

United States Patent Office 3,030,451

Patented Apr. 17, 1962

3,030,451

SWITCHING DEVICE

Oscar D. Jacobson, Bronx, N.Y., assignor to Bell Telephone Laboratories, Incorporated, New York, N.Y., a corporation of New York Filed Nov. 4, 1958, Ser. No. 771,817
12 Claims. (Cl. 179—27.54)

This invention relates, in general, to circuit controlling devices and, in particular, to switching devices employing the coordinate principle of establishing electrical connections. For convenience, switching devices employing the aforesaid coordinate principle will, hereinafter, be designated as coordinate switching devices, or, coordinate switches.

Coordinate switches are especially useful for establishing electrical connections among various circuits selected from a plurality of circuit groups. For example, in a telephone communication system comprising a first group of ten subscriber lines and a second group of ten subscriber lines, a coordinate switch, located at a central station and connected with both subscriber line groups, will enable any subscriber line in the first group to be connected with any subscriber line in the second group.

Among the many types of coordinate switching devices known in the art is the type which can be designated, conveniently, as the magnetically operable coordinate switch. Briefly, this type of coordinate switch embodies the functional concept of influencing selected switch contacts, among a group of switch contacts, with a plurality of magnetic fields in order to cause the establishment of electrical connections among circuits associated with the selected switch contacts. An early example of this type of coordinate switching device is disclosed in the specification of United States Patent 1,107,366, issued on August 18, 1914, to C. E. Scribner. A more recent example of this type of coordinate switching device is disclosed in the specification of United States Patent 2,187,115, issued on January 16, 1940, to W. B. Ellwood and W. H. T. Holden.

The Scribner patent discloses a coordinate switching device comprising: a row-and-column arrangement of relays, each relay having first and second coils and a set of contacts; a row-control circuit for each row of relays, each row-control circuit including the first coil of all the relays in the row; a column-control circuit for each column of relays, each column-control circuit including the second coil of all the relays in the column. In order to operate a particular relay, the row-control and column-control circuits associated with it are both energized, whereby both of the relay's coils provide sufficient magnetomotive force to cause the relay's contacts to assume an operated status.

The Ellwood and Holden patent discloses a coordinate switch comprising: a row-and-column arrangement of switch units; a longitudinal row-control coil for each row of switch units, surrounding all the switch units in the row; a longitudinal column-control coil for each column of switch units, surrounding all the switch units in the column. Each switch unit is located at a crosspoint defined by an intersection of a row-control coil and a column-control coil. In order to operate a particular switch unit, the row-control and column-control coils associated with it are both energized, whereby both coils provide sufficient magnetomotive force to cause the switch unit to assume an operated status.

In order for the magnetically operable coordinate switching devices, hereinbefore described, to function reliably, all of the control coils associated with a selected switch unit, or, set of contacts, are required to exercise their magnetic influence. Furthermore, each of the control coils is required to produce a magnetomotive force which is neither too weak nor too strong, but, rather, maintained within a defined magnetic margin. In short, magnetically operable coordinate switching devices of the character hereinbefore described have a magnetically marginal operating characteristic. Such switching devices, therefore, are susceptible of being operated falsely. For example, if either of the two control circuits associated with a particular switch unit, or, set of contacts, is over-energized, the switch unit, or, set of contacts, will assume an operated status even though the other control circuit is not energized. In addition, all of the switch units, or, sets of contacts, in a row, or, in a column, will become operated. Over-energization of a control circuit is easily caused by a rise in line voltage and/or a drop in temperature.

Therefore, the objects of this invention include: the improvement, structurally and functionally, of coordinate switching devices; the enabling of reliable coordinate switching operations; the improvement of the marginal operating characteristic of magnetically operable coordinate switching devices; the attainment of the aforementioned objects with simple, reliable and economical means.

These and other objects are achieved by this invention which is, hereinafter, illustrated by specific embodiments. The following brief description of one embodiment of the invention, a magnetically operable coordinate switch, will serve to illustrate the nature of the invention and some of its important features.

A group of switch units is arranged in a row and column pattern. Each switch unit has, inter alia, a first coil and a second coil. A separate row-control circuit is provided for each row of switch units and this circuit includes the first coil of all the switch units in the row. Similarly, a separate column-control circuit is provided for each column of switch units and this circuit includes the second coil of all the switch units in the column.

Each switch unit comprises a first reed, a second reed and a third reed. The first reed is supported near one of its ends by a mounting means and the free end of this reed is located between the second and third reeds and aligned in overlapping relationship with the second and third reeds. The normal, or, rest, position of the first reed's free end is such that it is in contact with the second reed and is separated from the third reed by an air gap. A mounting means is provided for keeping the second and third reeds fixedly spaced apart and for preventing these reeds from having freedom of motion. For manufacturing convenience, all of the reeds may be made from the same magnetizable material. In order to achieve a wider magnetic operating margin, the second reed may have a smaller cross-sectional area than either of the other reeds. This feature will be described, hereinafter, in more detail.

The first coil surrounds the first reed and, as long as it is energized, introduces a first magnetic field into the first reed. Similarly, the second coil surrounds the second reed and, as long as it is energized, introduces a second magnetic field into the second reed. If both coils are energized, so that like magnetic poles are created at the contacting portions of the first and second reeds, the first reed's free end will be caused, by the force of magnetic repulsion, to transfer from its normal position and make contact with the third reed thereby establishing an electrical connection between circuits associated with these contacting reeds. Advantageously, the energization, however great, of but one of the coils will not cause the first reed to make contact with the third reed because the magnetic circuit including the first and second reeds, normally in contact, presents a more receptive path for magnetic flux than the first and third reeds, normally separated by an air gap. Consequently, the energization of one of the coils will not cause a switch unit to operate falsely in response thereto.

If the switch unit is required to perform a latching function, means can be provided to cause the first reed to become latched, or, held, in contact with the third reed even though the first and second coils are, subsequently, deenergized. For example, a suitably located permanent magnet, associated with the first reed, will function to hold the first reed in contact with the third reed. In order to release, or, break the contact between, the latched first and third reeds, the first coil can be made to produce a magnetic field in opposition to the permanent magnet's field and thereby enable the first reed to resume its normal position.

In the interest of achieving trouble-free coordinate switching operations: an envelope is provided for enclosing the reeds so that switching can occur in a clean atmosphere; and, a shielding member is provided for each switch unit and its magnetic field producing elements so that neighboring switch units will not be affected by straying magnetic fields, associated with other switch units.

In order to achieve a compact coordinate switching device, the aforementioned array of switch units may be, conveniently, mounted on printed circuit boards.

Therefore, one of the features of this invention is the provision of a switch unit having contact members and a plurality of magnetic field producing means organized in such manner that the switch unit cannot change from its normal, or, unoperated, status unless all the field producing means exercise their influence and unless each of the field producing means provides a defined minimum magnetomotive force. Another feature of this invention resides in the spatial and/or structural relationship among the switch unit's contact members whereby the operating margin of the switch unit is magnetically widened to allow improved switching operation. Another feature of this invention relates to the provision of magnetic field producing means for enabling the switch unit to remain latched, or, held in the operated status. Another feature of this invention is the provision of an envelope for enabling the contact members to function within a controlled environment. A further feature of this invention resides in the provision of a shielding member for isolating each switch unit, magnetically. A still further feature of this invention is the provision of a frame member having printed circuitry thereon for housing a coordinate array of switch units.

Other objects and features as well as a fuller understanding of the invention will be apparent by referring to the following description and claims, taken in conjunction with the accompanying drawings, in which:

Figure 1:
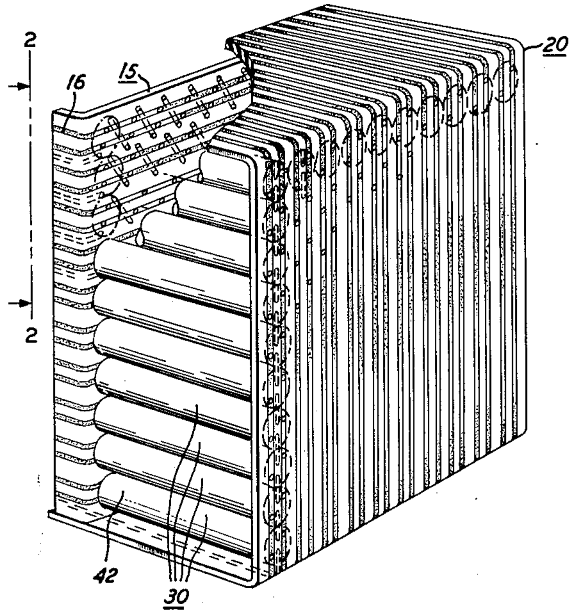
FIG. 1 is a perspective view, partly cut away, of a magnetically operable coordinate switch.
Figure 2:
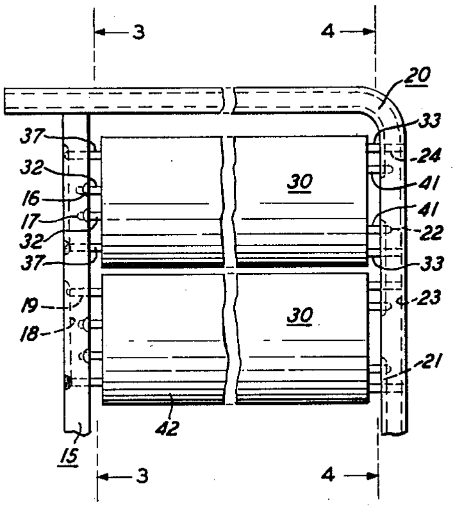
FIG. 2 is a partial view of a cross section, taken along the lines 2—2, of the coordinate switch in FIG. 1.

Referring now to the drawings, and, especially to FIG. 1, the magnetically operable coordinate switch shown there is comprised of 100 switch units, each switch unit being designated, generally, by the reference character 30, and a pair of frames, 15 and 20, for supporting all of the switch units. The switch units are arranged in a row and column pattern so that there are ten rows and ten columns; each row having ten switch units therein; and, each column having ten switch units therein. As indicated, the switch units 30 are mounted between the frames 15 and 20. In the illustrative embodiment shown in FIG. 1, both frames are U-shaped bodies of insulating material having printed circuit lines thereon and apertures therein. FIG. 2 illustrates the manner of mounting a switch unit 30 between frames 15 and 20. Each switch unit has four pairs of terminals extending therefrom. The terminal pairs 37 and 32 extend from one end of the switch unit and are received by the aperture pairs 19 and 17, respectively, located in frame 15. Similarly, terminal pairs 33 and 41 extend from the opposite end of the switch unit and are received by the aperture pairs 24 and 22, respectively, located in frame 20.

Figure 3:
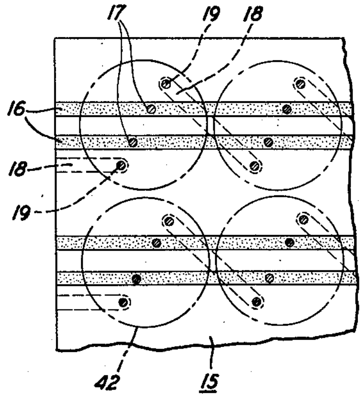
FIG. 3 is a cross-sectional view taken along the lines 3—3 of FIG. 2.
Figure 4:
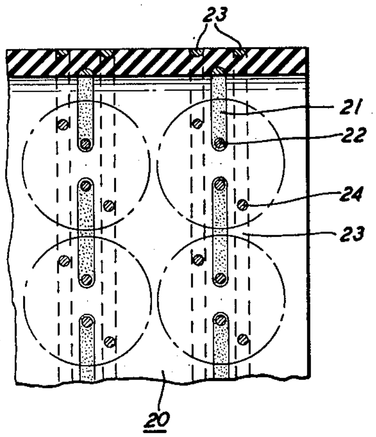
FIG. 4 is a cross-sectional view taken along the lines 4—4 of FIG. 2.

The FIGS. 3 and 4 show the printed circuitry configuration and arrangement of apertures for the frames 15 and 20, respectively. The frame 15 has a plurality of printed circuit lines 16 on one surface and another plurality of printed circuit lines 18 on the opposite surface. The apertures 17 are spaced along each of the printed circuit lines 16 and the apertures 19 are spaced along each of the printed circuit lines 18. Similarly, frame 20 has a plurality of printed circuit lines 21 on one surface and another plurality of printed circuit lines 23 on the opposite surface. Apertures 22 are spaced along each of the printed circuit lines 21 and apertures 24 spaced along each printed circuit line 23. The printed circuit lines 16, 18, 21 and 23 are recessed within grooves provided in the frames so that the circuit lines are flush with the surfaces of the frames. Thus, the printed circuit lines will not be scratched away on occasions when they are subjected to rough handling.

The frames 15 and 20 are formed from an electrical insulating material. For example, a plastic compound such as polyethylene, or the like, can be formed to the shapes indicated in FIG. 1. The printed circuit lines 16, 18, 21 and 23 can be applied to the frames of any of the processes ordinarily used. For example, a mixture comprising a finely divided conductive metal such as silver, or the like, and an adhesive binder can be applied to the frames in accordance with the configuration indicated in FIGS. 1, 3 and 4. As another example, silver can be electrolytically deposited on a dissimilar metal which is arranged in the desired circuit configuration, hereinbefore indicated, and bonded to the frames. Although the embodiment herein described employs printed circuitry, other wiring methods can be used. For example, inlaid wires, or, foils, of silver, or copper, in a matrix of electrical insulating material, formed as indicated, hereinbefore, would be suitable. The apertures 17, 19, 22 and 24 can be punched in the plastic frames, or, formed therein if the frames are originally moulded to the indicated shapes. When a switch unit's terminals are inserted into the frame's apertures the terminals are electrically connected with the printed circuit lines. This connection can be achieved in many ways. For example, a tubular insert of conductive metal, not shown, can be placed into the apertures. This insert would be fastened to the frame and bonded to the printed circuit line. In order to achieve a good electrical connection between the switch unit's terminals and the inserts, the clearance between the insert's inside diameter and the terminal's diameter should be small so that a tight fit is obtained.

Figure 5:
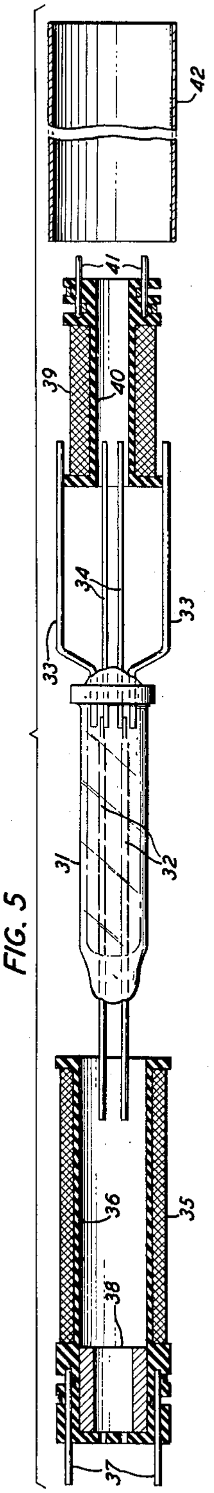
FIG. 5 is an exploded view of a switch unit.
Figure 6:
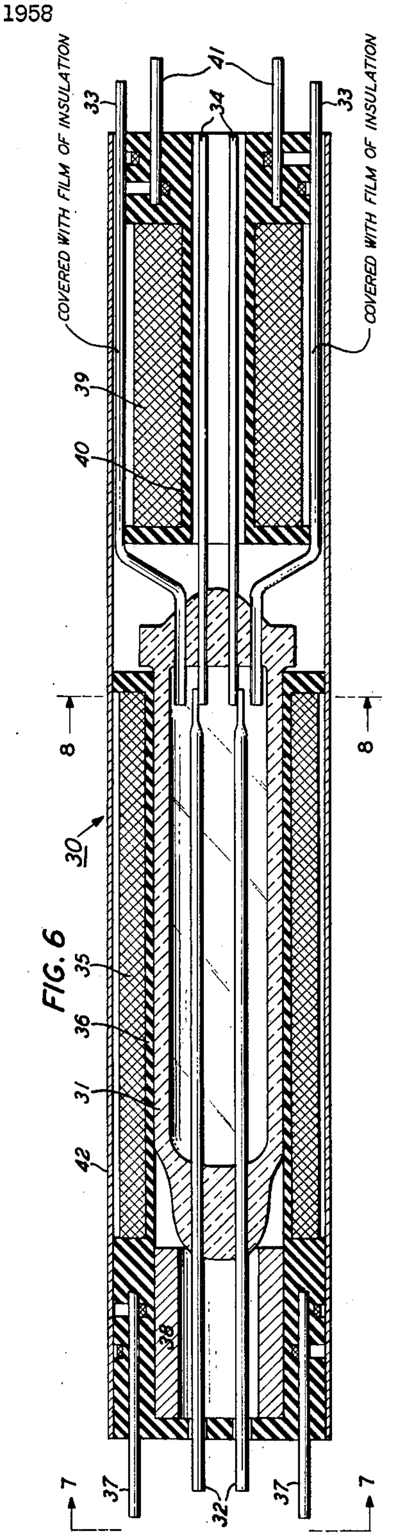
FIG. 6 is a cross-sectional view of an assembled switch unit.
Figure 9:
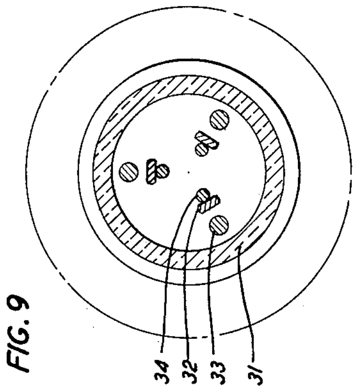
FIG. 9 is a view of a cross section, taken along the lines 8—8, of the switch unit shown in FIG. 6 when three sets of reeds, rather than two are used in constructing the switch unit.

Referring now to the FIGS. 5 and 6, the switch unit 30 is comprised of: the reed pairs 32, 33 and 34; the envelope 31; the coils 35 and 39; the permanent magnet 38; and, the magnetic shield 42. First reeds 32, second reeds 34 and third reeds 33 are secured and partially enclosed within envelope 31. The envelope 31 encloses a substantial longitudinal portion of each reed 32, but it encloses only the end portions of reed pairs 33 and 34. In the specific embodiment illustrated in FIGS. 5, 6 and 8, each reed 32 is aligned in a parallel overlapping relationship with a reed 33 and a reed 34. Within the envelope 31, a portion of each reed 32 is secured by being sealed into one end of the envelope and one extremity of each of these reeds is free to move laterally. The normal, or, rest, position of each first reed 32 is such that its freely movable end is in contact with a second reed 34. The operated position of each first reed 32 is such that it is in contact with a third reed 33. Therefore, whenever a first reed 32 changes from a normal status to an operated status, it breaks contact with a second reed 34 and makes contact with a third reed 33 by moving laterally from the former to the latter reed. Coils 35 and 39, the first and second coils, are wound on the hollow spools 36 and 40, respectively. The permanent magnet 38, a short hollow cylinder, is positioned within spool 36 at the head end thereof. As indicated in FIG. 6, switch unit 30 is easily assembled in the following manner: slide spool 36 over envelope 31; slide spool 40 between reeds 33 and over reeds 34 so that coil 39 coaxially surrounds the reeds 34, and so that reeds 33 straddle the outside of coil 39; slide shield 42 over the parts heretofore assembled.

Figure 8:
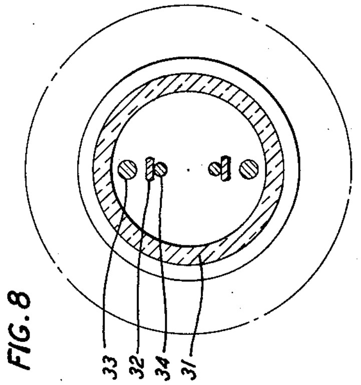
FIG. 8 is a view of a cross section, taken along the lines 8—8, of the switch unit shown in FIG. 6.
Figure 7:
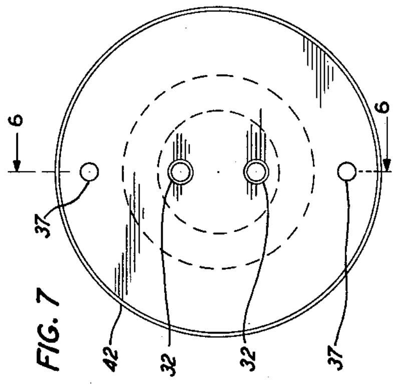
FIG. 7 is a view of an end section, taken along the lines 7—7, of the switch unit shown in FIG. 6.

The reeds are formed from a material having a low ohmic resistance and low magnetic reluctance. For example, an alloy designated as No. 52 alloy (52 percent Ni—48 percent Fe) is a suitable material. Soft iron is another suitable material. In the illustrative embodiment shown in the drawings, each of the reeds is a longitudinal rod having a circular cross section; each reed 33 having a bend therein to enable it to enter one end of envelope 31 and to pass along the outer edge of coil 39; each reed 32 having its contact-making portion flatted, as shown in FIG. 8, so that a greater contact area with the ends of reeds 33 and 34 can be achieved whereby a low contact resistance between the reeds is attained. As shown in FIG. 8, each reed 34 has a smaller cross-sectional area than either of the reeds 32 or either of the reeds 33. Consequently, each reed 34 will become magnetically saturated at a lower value of magnetomotive force than either of the reeds 32 or either of the reeds 33. Furthermore, the reeds 34, as compared with the reeds 32 and the reeds 33, approach magnetic saturation more rapidly in response to increasing values of magnetomotive force. The significance of these characteristics will become better appreciated when, hereinafter, the operation of the coordinate switch is discussed in more detail.

The envelope 31 is formed from a non-magnetizable material such as glass, or the like. Although an envelope is not indispensable to the successful operation of the switch unit 30, it will provide a dirt-free environment and thereby increase the switch unit's measure of reliability. The method of aligning reeds within a glass envelope and sealing the envelope about the reeds is already known in the art. For example, the method disclosed in the specification of United States Patent 2,535,400, issued on December 26, 1950, to W. B. Ellwood, is generally illustrative of a method that may be employed.

The coil 35, the first coil, shown in FIGS. 5 and 6, is wound upon spool 36. Similarly, coil 39, the second coil, is wound upon spool 40. Both spools are formed from an insulating material such as polyethylene, or the like. Advantageously, a plastic insulating material can be moulded to provide a spool-head integral with the spool. Accordingly, both spools 36, and 40, have a head portion, or, spool-head, located at one end thereof. Both spool-heads have apertures therein for receiving and retaining the coil terminal pins. Spool 36 has a pair of apertures for coil terminal pins 37 as shown in FIG. 6. Furthermore, spool 36 has a group of apertures for allowing each reed 32 to pass through the spool head. Similarly, spool 40 has a pair of apertures for coil terminal pins 41. Each spool-head has a pair of grooves cut in the periphery thereof in order to simplify the coil finishing operations. In addition, a portion of the grooves is partially flatted so that the coiled wire can rest on a flat surface. The coil terminal pin pairs, 37 and 41, have either a smooth or a serrated surface in order to effect a solderless connection with the coiled wire resting in the flatted groove portion, as the terminal pins are driven into the apertures and tangentially across the periphery of the coiled wire bank. However, inasmuch as the coil wire will often be of very fine gauge, especially in miniature coils, it is preferred that a terminal pin having a smooth surface be used and, further, that a mechanical abrasion of the coiled wire bank be avoided. Accordingly, a small space between the top of the wire bank and the terminal pin will allow a molten solder globule to be placed between the wire bank and the terminal pin. The coiled wire is provided with a thermally removable electrical insulating film and when the molten solder globule is placed on the coiled wire bank, the insulating film will evaporate and the solder will bridge the space between the terminal pin and wire bank. Consequently, when the solder sets, an electrical bond between the coiled wire and the terminal pins is achieved.

As is indicated in FIGS. 5 and 6, the permanent magnet 38 is a short hollow cylinder coaxially enclosing the end portions of the reeds 32, the first reeds. The permanent magnet is sized to fit within spool 36 as shown in the aforementioned figures.

The shielding member 42 is an elongated hollow cylinder of low magnetic reluctance which coaxially surrounds the permanent magnet, glass envelope, reeds assembly, and coils.

Each switch unit 30 is capable of performing a latching function if the permanent magnet 38 is included therein. If, however, the permanent magnet 38 is omitted, the switch unit is capable of functioning as an ordinary "make" and "break" switch, i.e., the switch unit can perform as a non-latching switch.

Assuming that permanent magnet 38 has been omitted and that neither coil 35 nor coil 39 is energized, switch unit 30 is in the attitude shown in FIGS. 5 and 6. That is to say, reeds 32 are disposed in their normal, or, rest, position: the contacting portion of each reed 32 is disposed between a reed 33 and a reed 34 and rests against the reed 34; the contacting portion of reed 32 being separated from the reed 33 by an air gap. If coil 35, only, is energized, regardless of the polarity of the energizing current, a coil flux will be introduced into the reeds 32 and flow into the reeds 34 because of the proximity of each of the latter reeds to each of the former reeds. Unlike magnetic poles will be created between the contacting faces of each reed 32 and each reed 34 whereby these reeds will remain in contact with each other due to the force of the magnetic attraction between them. Inasmuch as an air gap separates the contacting portion of reed 32 from the contacting portion of reed 33, the coil flux in reed 32 will be presented with a path of lower reluctance by passing into reed 34 rather than reed 33. Consequently, a substantial portion of the coil flux, emanating from coil 35, will flow through the reeds 32 and 34. Similarly, if coil 39, only, is energized, regardless of the polarity of the energizing current, a coil flux will be introduced into the reeds 34 and flow into the reeds 32 because of the proximity of each of the former reeds to the latter reeds. For the reasons indicated, hereinbefore, each reed 32 will remain in contact with the reeds 34.

In order to cause any switch unit 30 to become operated, both coils, 35 and 39, must be energized, so that coil flux emanating from coil 35, the first coil, is opposed at the juncture of the reeds 32 and 34 by coil flux emanating from coil 39, the second coil. As a consequence, like magnetic poles are created between the contacting faces of each reed 32 and each reed 34 whereby the force of magnetic repulsion between these reeds causes the reeds 32 to move, laterally, and make contact with the reeds 33. So long as both coils, 35 and 39, are sufficiently energized as aforesaid, the reeds 32 will remain in contact with the reeds 33. Whenever the coils are deenergized, the reeds 32 resume their normal position; i.e., in contact with the reeds 34.

The switch unit 30 will perform a latching function if permanent magnet 38 is included in the switch unit's structure as indicated in the FIGS. 5 and 6. Assume that both coils, 35 and 39, have been energized so that the reeds 32 are in contact with the reeds 33, if coil 39, the second coil, is deenergized, the first coil, coil 35 will provide sufficient magnetic potential so that unlike poles are created between the contacting faces of the reeds 32 and the reeds 33. Consequently, the reeds 32 will remain in contact with the reeds 33. Furthermore, it has been found that a much smaller value of magnetomotive force is required to keep reeds 32 and reeds 33 in contact than the magnetomotive force required to cause reeds 32 to make contact with the reeds 33. Therefore, the permanent magnet can be substituted to perform the holding, or, latching, function. Of course, coil 35 could be tapped to provide the lesser amount of magnetomotive force required. This would mean that coil 35 would be continuously energized while the latching function is being performed. Continuous energization of coil 35 is eliminated by the use of permanent magnet 38 which will provide sufficient magnetic potential to keep the contacting reeds 32 and 33 latched in contact but will not provide sufficient magnetic potential to cause reeds 32 to move into contact with the reeds 33. The latched contact between reeds 32 and reeds 39 can be broken my momentarily energizing coil 35 so that it produces a magnetic field in opposition to the permanent magnet's field whereby the latching effect of the permanent magnet's field is overcome.

Therefore, switch unit 30, whether it be arranged for the performance of a latching or a non-latching function, will not become operated unless both coils, 35 and 39, are energized. Energizing one of these coils will not cause the switch to operate even if the coil is over-energized. Theoretically, one coil could be energized with a current of infinite magnitude and the first reeds, reeds 32, would not break contact with the reeds 34 and make contact with the reeds 33.

Figure 11:
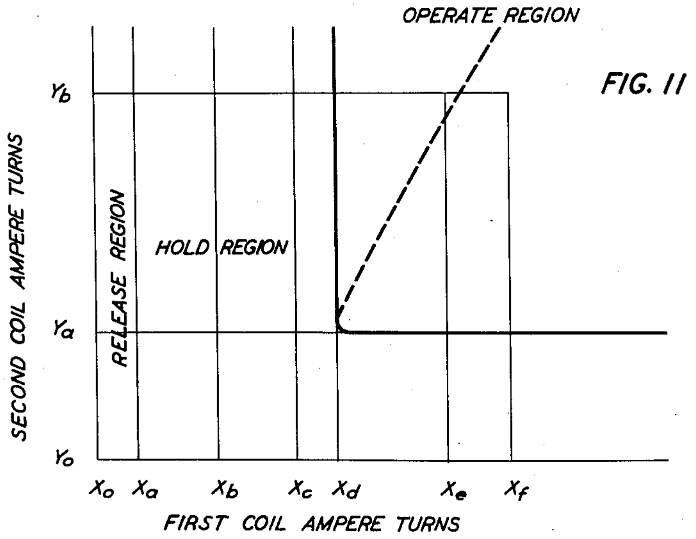
FIG. 11 is a graphical representation showing the magnetomotive force relationships for a switch unit.

FIG. 11 is a graphical representation showing the magnetomotive forces required to cause the switch unit 30 to assume an operated status. Although first coil ampere turns are plotted against second coil ampere turns, both of these factors are, in the mathematical sense, independent variables. Switch unit operation, occurring in the "operate region," is the dependent variable, mathematically speaking. When the first coil 35 is energized to a value of X*d*, or more, ampere turns and the second coil 39 is simultaneously, energized to a value of Y*a*, or more, ampere turns, the magnetic fields being in opposition to each other, the first reeds 32 will break contact with the second reeds 34 and make contact with the third reeds 33. Since the second reeds 34 have a smaller cross-sectional area than the first reeds 32 and the third reeds 33, they will become magnetically saturated at a lower value of magnetomotive force than reeds 32 and reeds 33. Consequently, the switch unit 30 has a right-angle operating curve which provides a wide magnetic operating margin. If all of the reeds have equal cross-sectional areas, the operating curve would be V-shaped as defined by the dotted line and the line Y*a*. As a consequence, the magnetic operating margin is narrower. In the switch unit having a right-angle operating curve, energizing the first and second coils to the magnetomotive force values X*e* and Y*b*, respectively, would cause the switch unit to operate. However, in a switch unit having the V-shaped operating curve, the same values, X*e* and Y*b*, would not cause the switch unit to operate. Either the first coil's energization would have to be increased to X*f*, for example, or the second coil's energization would have to be reduced from the value Y*b*. Therefore, in order to cause switch operation, the minimum magnetomotive forces required from the first and second coils are interdependent.

If switch unit 30 is to perform a latching function, a permanent magnet 38 or a tapped first coil is provided so that a magnetic field, having a mean magnetomotive force X*b*, continuously influences the reeds 32. This magnetic field can have wide marginal limits. For example, its magnetomotive force should not be so strong as the value X*d* so that it would be possible to cause the switch unit to operate, nor should its magnetomotive force be so weak as to be less than the value X*a* so that the latching function can not be performed. Therefore, the upper and lower limits, X*c* and X*a*, respectively, are the tolerable limits. Assuming that the first coil and the permanent magnet produce a magnetic field having the value of magnetomotive force X*d*, or more, and that the second coil is energized to the value Y*a*, or more, the switch unit will become operated. When the first and second coils are deenergized, a lesser value of magnetomotive force is required to maintain the switch unit in an operated condition. This value can be as small as X*a*. Therefore, the region bounded by the lines X*a* and X*c* is designated as the "hold region" and the region bounded by the lines X*o* and X*a* is designated as the "release region."

Figure 10:
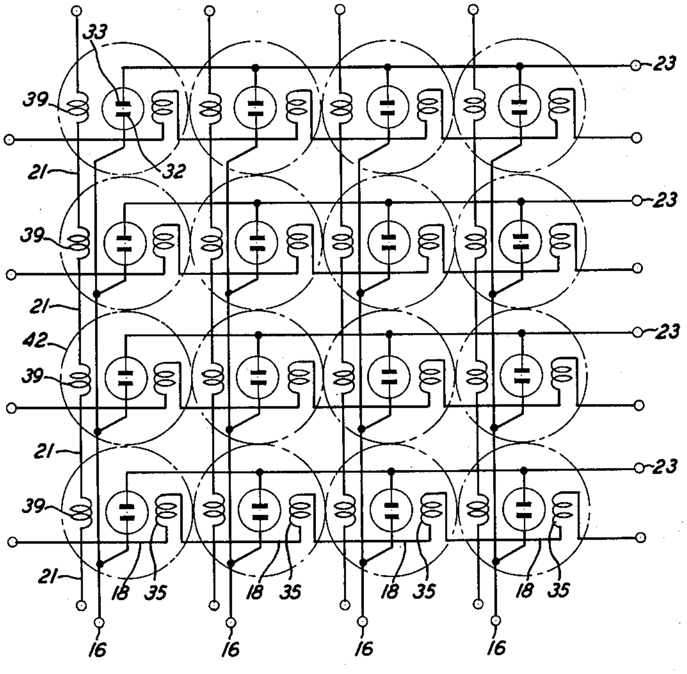
FIG. 10 is a schematic representation of the electrical circuitry of a magnetically operable coordinate switch.

FIG. 10 shows, in schematic form, the electrical circuitry for a coordinate switch having four rows and four columns of switch units, each row having four switch units and each column having four switch units. In each row, the coils 35 are serially connected, and in each column, the coils 39 are serially connected. Although the coordinate switch depicted in FIG. 1 is a ten-row and ten-column device, the wiring pattern is the same as shown in FIG. 10. For example, the coils 39 are serially connected by circuit lines 21, the coils 35 are serially connected by circuit lines 18, the reeds 32 are connected to circuit lines 16, and the reeds 33 are connected to circuit lines 23.

Although specific embodiments of the invention have been shown and described, it is to be understood that they are used for the purpose of illustrating the invention and various modifications may be made thereon without departing from the scope and spirit of the invention.

What is claimed is:

1. A coordinate switching device comprising a row-and-column array of switch units, each switch unit having a first coil and a second coil, each row of switch units having a row-control circuit and each column of switch units having a column-control circuit, each row-control circuit including the first coil of every switch unit in the row and each column-control circuit including the second coil of every switch unit in the column, each said switch unit comprising a first magnetizable reed having a fixed end and a free end, said free end being normally in contact with a fixed second magnetizable reed and movable therefrom to make contact with a fixed third magnetizable reed, said first and second coils surrounding the first and second reeds, respectively, the second reed being magnetically saturable at a lower value of magnetomotive force than either the first reed or the third reed.

2. A coordinate switching device comprising a row-and-column array of switch units, each switch unit having a first coil and a second coil, each row of switch units having a row-control circuit and each column of switch units having a column-control circuit, each row-control circuit including the first coil of every switch unit in the row and each column-control circuit including the second coil of every switch unit in the column, each said switch unit comprising a first magnetizable reed having a fixed end and a free end, said free end being normally in contact with a fixed second magnetizable reed and movable therefrom to make contact with a fixed third magnetizable reed, said first and second coils surrounding the first and second reeds, respectively, each switch unit being enclosed in a magnetic shielding member, the second reed being magnetically saturable at a lower value of magnetomotive force than either the first reed or the third reed.

3. A coordinate switching device comprising a row-and-column array of switch units, each switch unit having a first means for producing a magnetic field and a second means for producing a magnetic field, a plurality of row-control means and a plurality of column-control means, each row of switch units having a row-control means associated therewith and each column of switch units having a column-control means associated therewith, each row-control means including the first means of every switch unit in the row and each column-control means including the second means of every switch unit in the column, each said switch unit comprising a first magnetizable member normally in contact with a second fixed magnetizable member and movable therefrom to make contact with a third fixed magnetizable member, the first means being located near the first member and the second means being located near the second member, said second magnetizable member being magnetically saturable at a lower value of magnetomotive force than either the first member or the second member.

4. A coordinate switching device comprising a row-and-column array of switch units, each switch unit having a first means for producing a magnetic field and a second means for producing a magnetic field, each row of switch units having a row-control means associated therewith and each column of switch units having a column-control means associated therewith, each row-control means including the first means of every switch unit in the row and each column control means including the second means of every switch unit in the column, each said switch unit comprising a first magnetizable member normally in contact with a fixed second magnetizable member and movable therefrom to make contact with a third fixed magnetizable member, said first and second means being located near the first and second magnetizable members, the second member being magnetically saturable at a lower value of magnetomotive force than either of the other magnetizable members.

5. A circuit controlling device comprising a first magnetizable reed having a fixed end and a free end, said free end being normally in contact with a fixed second magnetizable reed and movable therefrom to contact a fixed third magnetizable reed, a first coil surrounding the first reed and a second coil surrounding the second reed, said second magnetizable reed being magnetically saturable at a lower value of magnetomotive force than either the first reed or the third reed.

6. A circuit controlling device comprising a first magnetizable member normally in contact with a fixed second magnetizable member and movable therefrom to contact a fixed third magnetizable member, and magnetic field producing means for moving the first member into contact with the third member, said second member being magnetically saturable at a lower value of magnetomotive force than either the first member or the third member.

7. A circuit controlling device comprising a first magnetizable reed having a fixed end and a free end, said free end being normally in contact with a fixed second magnetizable reed and movable therefrom to contact a fixed third magnetizable reed, a first coil surrounding the first reed and a second coil surrounding the second reed, and permanent magnet means located near the first reed, said second reed being magnetically saturable at a lower value of magnetomotive force than either the first reed or the third reed.

8. A circuit controlling device comprising a first magnetizable reed having a fixed end and a free end, said free end being normally in contact with a fixed second magnetizable reed and movable therefrom to contact a fixed third magnetzable reed, a first coil surrounding the first reed and a second coil surrounding the second reed, permanent magnet means located near the first reed, and a casing of magnetic material for the device, said second magnetizable reed being saturable at a lower value of magnetomotive force than either the first or third reeds.

9. A circuit controlling device comprising a first magnetizable member having a fixed end and a free end, said free end normally being in contact with a fixed second magnetizable member and movable therefrom to contact a fixed third magnetizable member, magnetic field producing means for moving the first member into contact with the third member, and additional magnetic field producing means for holding the first and third members in contact, said second magnetizable member being magnetically saturable at a lower value of magnetomotive force than either the first or third members.

10. A circuit controlling device comprising a first magnetizable member having a fixed portion and a movable portion, said movable portion being normally in contact with a fixed second magnetizable member and movable therefrom to contact a fixed third magnetizable member, magnetic field producing means for moving the first member into contact with the third member and holding these members in contact, the second member being magnetically saturable at a lower value of magnetomotive force than either the first member or the third member, an envelope for enclosing the magnetizable members, said magnetizable members protruding through the envelope, and a casing of magnetizable material for enclosing the device.

11. A coordinate switching device comprising a row-and-column array of switch units, each switch unit having a first coil and a second coil, each row of switch units having a row-control circuit and each column of switch units having a column-control circuit, each row-control circuit including the first coil of every switch unit in the row and each column-control circuit including the second coil of every switch unit in the column, said switch unit comprising a first magnetizable reed having a fixed end and a free end, said free end being positioned between a fixed second magnetizable reed and a fixed third magnetizable reed such that said free end is normally more proximate to the second reed than the third reed, the second reed being magnetically saturable at a lower value of magnetomotive force than either the first reed or the third reed, the first coil surrounding the first reed and the second coil surrounding the second reed, said free end being movable to make contact with the third reed, permanent magnet means located near the first reed, and magnetic shielding means for each switch unit.

12. A circuit controlling device comprising a movable, first magnetizable contact member, a fixed, second magnetizable contact member, a fixed, third magnetizable contact member, the second contact member being magnetically saturable at a lower value of magnetomotive force than either of the other contact members, the first contact member being normally positioned more proximate to the second contact member than to the third contact member, a first coil, encompassing the first contact member, operable for producing a first magnetic field, and a second coil, encompassing the second contact member, operable for producing a second magnetic field, the first and second magnetic fields being so oriented, when they are both present and each has attained at least a predetermined minimum strength, as to create like magnetic poles between the first and second contact members thereby causing the first contact member to move into contact with the third contact member, the presence of either magnetic field alone being insufficient to move the first contact member from its normal position.

References Cited in the file of this patent

UNITED STATES PATENTS

| | | |
|---|---|---|
| 2,187,115 | Ellwood et al. | Jan. 16, 1940 |
| 2,245,391 | Dickten | June 10, 1941 |
| 2,257,900 | Crum | Oct. 7, 1941 |
| 2,264,022 | Ellwood | Nov. 25, 1941 |
| 2,264,746 | Ellwood | Dec. 2, 1941 |
| 2,289,830 | Ellwood | July 14, 1942 |
| 2,326,647 | Horton | Aug. 10, 1943 |
| 2,331,514 | Stibitz | Oct. 12, 1943 |
| 2,481,003 | Curtis | Sept. 6, 1949 |
| 2,877,316 | Peek | Mar. 10, 1959 |
| 2,907,846 | Wilhelm | Oct. 6, 1959 |
| 2,922,856 | Kaner | Jan. 26, 1960 |